US008826392B2

(12) United States Patent
Abe

(10) Patent No.: US 8,826,392 B2
(45) Date of Patent: Sep. 2, 2014

(54) DEVICE AND METHOD FOR AUTHENTICATING BIOLOGICAL INFORMATION

(75) Inventor: Narishige Abe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 87 days.

(21) Appl. No.: 13/233,068

(22) Filed: Sep. 15, 2011

(65) Prior Publication Data

US 2012/0090015 A1 Apr. 12, 2012

(30) Foreign Application Priority Data

Oct. 8, 2010 (JP) .................................. 2010-228130

(51) Int. Cl.
*H04L 9/32* (2006.01)
*G06F 21/32* (2013.01)
*G06K 9/00* (2006.01)
*G07C 9/00* (2006.01)

(52) U.S. Cl.
CPC .............. *H04L 9/3231* (2013.01); *G06F 21/32* (2013.01); *G06K 9/00026* (2013.01); *G07C 9/00158* (2013.01)
USPC ................................................ 726/5; 726/19

(58) Field of Classification Search
None
See application file for complete search history.

(56) References Cited

U.S. PATENT DOCUMENTS

| | | | | | |
|---|---|---|---|---|---|
| 6,993,659 | B2* | 1/2006 | Milgramm et al. | ........... | 709/203 |
| 7,020,308 | B1* | 3/2006 | Shinzaki et al. | ............. | 382/124 |
| 7,111,174 | B2* | 9/2006 | Hamid | .......................... | 713/186 |
| 7,178,688 | B2* | 2/2007 | Naufel et al. | ................... | 221/28 |
| 7,685,432 | B2* | 3/2010 | Mochizuki | .................... | 713/186 |
| 7,689,834 | B2* | 3/2010 | Igarashi | ......................... | 713/186 |
| 2003/0200322 | A1* | 10/2003 | Childs et al. | .................. | 709/229 |
| 2003/0204290 | A1* | 10/2003 | Sadler et al. | ...................... | 701/1 |
| 2004/0064453 | A1* | 4/2004 | Ruiz et al. | ......................... | 707/9 |
| 2004/0129716 | A1* | 7/2004 | Naufel et al. | ..................... | 221/9 |
| 2004/0158723 | A1* | 8/2004 | Root | .............................. | 713/186 |
| 2006/0120577 | A1* | 6/2006 | Shinzaki et al. | ............. | 382/124 |
| 2007/0024893 | A1* | 2/2007 | Hosoda | ......................... | 358/1.14 |
| 2007/0159309 | A1* | 7/2007 | Ito et al. | ..................... | 340/425.5 |
| 2007/0280515 | A1* | 12/2007 | Goto | ............................. | 382/124 |
| 2008/0229400 | A1* | 9/2008 | Burke | ............................... | 726/7 |
| 2009/0276223 | A1* | 11/2009 | Jaiswal et al. | ............. | 704/270.1 |
| 2010/0066494 | A1* | 3/2010 | Martis et al. | ................. | 340/5.83 |
| 2010/0142764 | A1* | 6/2010 | Ikegami | ..................... | 382/115 |
| 2010/0192096 | A1* | 7/2010 | Barrett | .......................... | 715/811 |
| 2014/0101434 | A1* | 4/2014 | Senthurpandi et al. | ........ | 713/150 |
| 2014/0101453 | A1* | 4/2014 | Senthurpandi | ................ | 713/172 |

FOREIGN PATENT DOCUMENTS

| | | | |
|---|---|---|---|
| JP | 2005-78443 A | | 3/2005 |
| JP | 2006-99563 A | | 4/2006 |

* cited by examiner

*Primary Examiner* — Christopher Revak
(74) *Attorney, Agent, or Firm* — Fujitsu Patent Center

(57) ABSTRACT

An biological-information authentication device includes, a biological-information reading section configured to read biological information; a comparing section configured to compare biological information read by the biological-information reading section with registered biological information to determine whether they match; a registration section configured to register biological information; a biological-information-input-operation extraction section configured to extract input operation data indicating an input operation of biological information read by the biological-information reading section. The device further includes an approval-input-operation determination section configured to determine whether the input operation data of the biological information extracted by the input-operation extraction section matches approval input operation data indicating an input operation for approval that is stored in advance when the comparing section determines that the biological information is unregistered biological information and that biological information input next to the unregistered biological information matches the registered biological information of an administrator having approval authority.

15 Claims, 19 Drawing Sheets

DEVICE AND METHOD FOR AUTHENTICATING BIOLOGICAL INFORMATION

CROSS-REFERENCE TO RELATED APPLICATION

This application is based upon and claims the benefit of priority of the prior Japanese Patent Application No. 2010-228130, filed on Oct. 8, 2010, the entire contents of which is incorporated herein by reference.

FIELD

Embodiments disclosed herein relate to a device and method for authenticating biological information.

BACKGROUND

Fingerprint sensors have been recently installed in consumer equipment, such as notebook computers and mobile phones, thus increasing the opportunity to use a fingerprint authentication function. Using the fingerprint authentication function requires a user to register fingerprint information in advance. However, the registration of fingerprint information needs a special operation, which is not easy for anyone to perform. Thus, to simplify the registration operation, the following technologies have been proposed.

Japanese Laid-open Patent Publication No. 2006-99563 discloses a technology for a biometric authentication device using a face image in which the mode is shifted to a registration mode by a specific operation that only an administrator knows so that images of a plurality of persons' faces can be registered. Detection examples of the specific operation include detecting an input of specific information that only the administrator knows, recognizing the face of the administrator, and detecting that an integrated circuit (IC) card read by an IC card reader is a specific IC card.

Japanese Laid-open Patent Publication No. 2005-78443 discloses a technology for a fingerprint recognition device in which a registration management card is issued, and when the registration management card is inserted into an IC card reader, fingerprint registration is enabled.

With the known technologies described above, for example, if recognition of an administrator's face is set as the specific operation, the mode is shifted to the registration mode every time the administrator's face is recognized, thus posing a problem in that the administrator cannot enter an ordinary recognition mode with the biometric authentication device. Furthermore, the method of registering a fingerprint using a registration management card has the problem that an IC card reader or the like for reading the registration management card is needed.

SUMMARY

In accordance with an aspect of the embodiments, a biological-information authentication device includes, a biological-information reading section configured to read biological information; a comparing section configured to compare biological information read by the biological-information reading section with registered biological information to determine whether they match; a registration section configured to register biological information; a biological-information-input-operation extraction section configured to extract input operation data indicating an input operation of biological information read by the biological-information reading section; and an approval-input-operation determination section configured to determine whether the input operation data of the biological information extracted by the input-operation extraction section matches approval input operation data indicating an input operation for approval that is stored in advance when the comparing section determines that the biological information is unregistered biological information and that biological information input next to the unregistered biological information matches the registered biological information of an administrator having approval authority, when it is determined that the input operation data matches the approval input operation data, to instruct the registration section to register the unregistered biological information.

The object and advantages of the invention will be realized and attained by at least the features, elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which.

DESCRIPTION OF EMBODIMENTS

Figure 1:
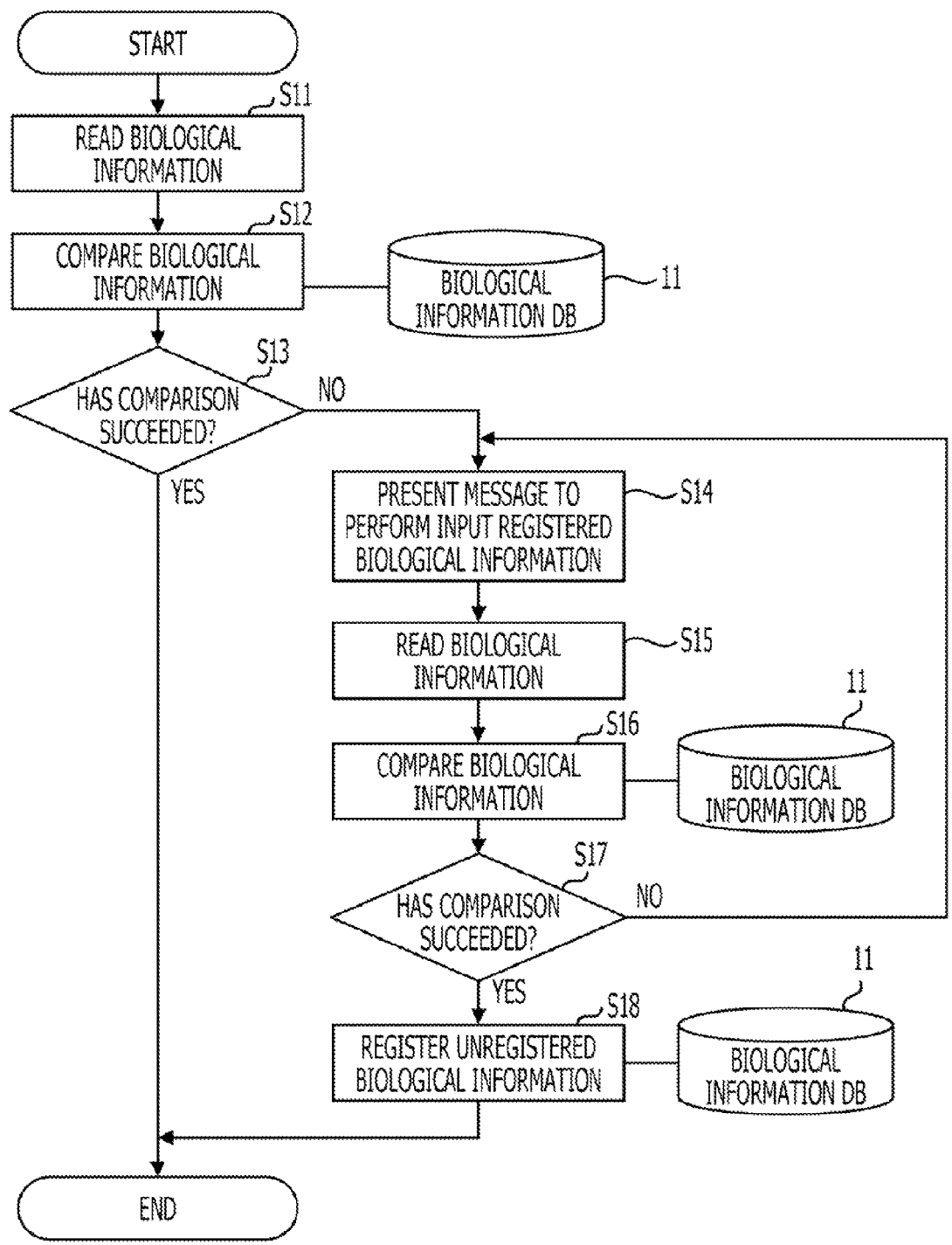
FIG. 1 is a flowchart of a biological-information registration and authentication process.

Embodiments will be described with reference to the drawings. First, a method for registering unregistered biological information by inputting the biological information of a specific administrator will be described. FIG. 1 is a flowchart of a biological-information registration and authentication process of this case.

Biological information is read by a biological-information reading section, such as a fingerprint sensor (FIG. 1, S11). The biological information read by the biological-information reading section is temporarily stored in a memory or the like as unregistered biological information.

Next, the read biological information is compared with biological information registered in a biological information database 11 (S12). It is determined whether the comparison of the biological information has succeeded (S13). If the comparison has succeeded (S13, YES), the subject is authenticated, and the process is finished.

If the comparison has failed (S13, NO), in other words, if the input biological information is not registered in the biological information database 11 (S13, NO), the process moves to operation S14, where a message to input registered biological information is presented.

If biological information is input in response to the message, the biological information is read by a biological-information reading section (S15). Next, the input biological information and registered biological information of an administrator having approval authority, registered in the biological information database 11, are compared (S16).

It is determined whether the comparison of the biological information has succeeded (S17). If the comparison has succeeded (S17, YES), it is determined that the registration of the unregistered biological information is approved by the administrator, and the unregistered biological information stored in the memory or the like is registered in the biological information database 11.

If the comparison has failed (S17, NO), the process returns to operation S14, where the message to input registered biological information is displayed again. According to the foregoing biological-information registration and authentication method, unregistered biological information can be registered in the biological information database 11 by inputting the unregistered biological information and thereafter by an administrator having approval authority inputting biological information.

If an administrator having approval authority makes an authentication using the registration and authentication device without knowing that unregistered biological information is input, the unregistered biological information is registered. To facilitate registration of biological information, the following biological-information registration and authentication device is proposed.

Figure 2:
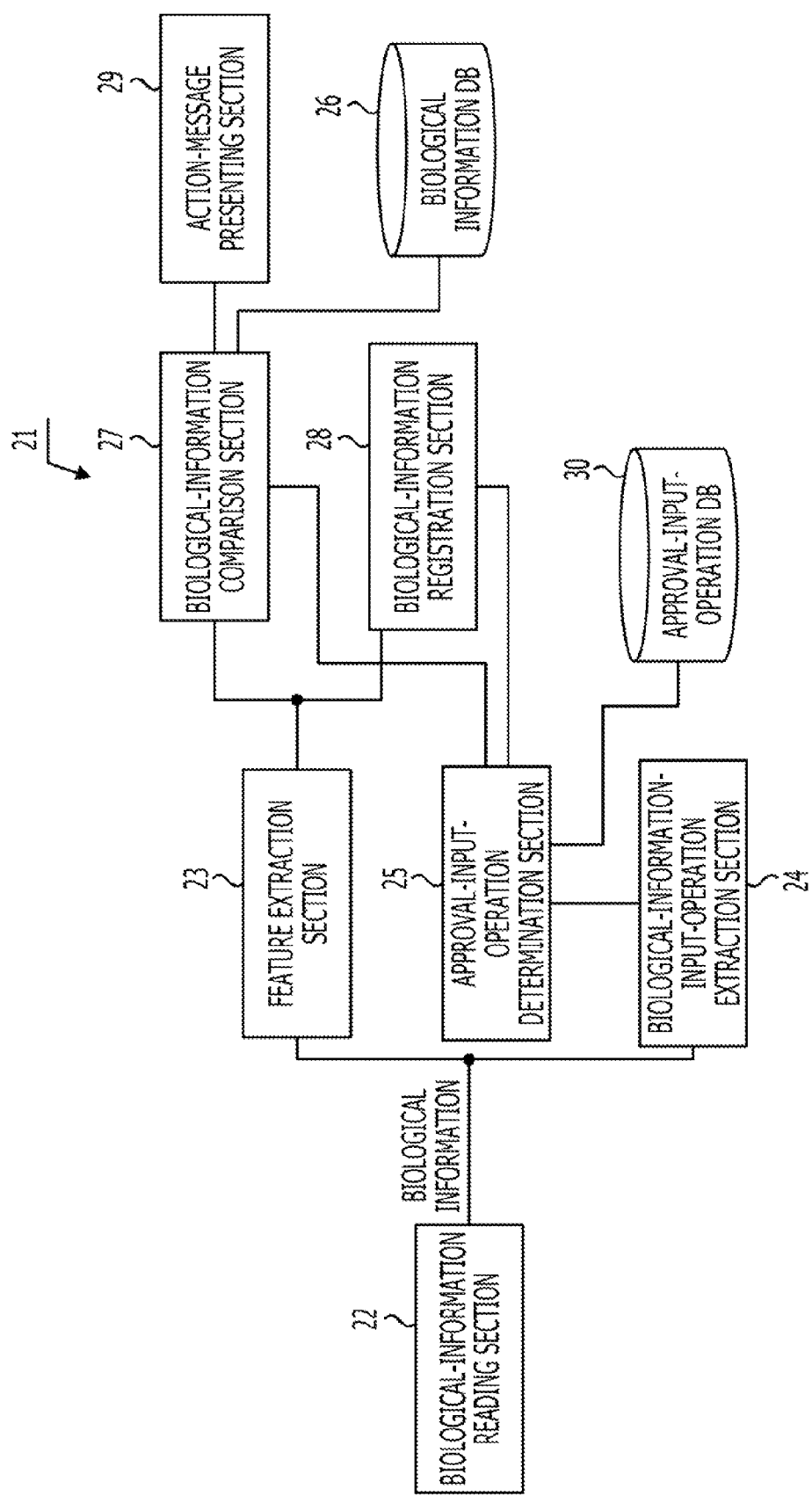
FIG. 2 is a diagram illustrating the configuration of a biological-information registration and authentication device of a first embodiment.

FIG. 2 is a diagram showing the configuration of a biological-information registration and authentication device 21 of a first embodiment. The biological-information registration and authentication device 21 may be either a single unit or be incorporated in an electronic device, such as a personal computer and a mobile phone.

In the first embodiment, unregistered biological information can be registered when an administrator having the authority to approve registration of biological information performs a predetermined input operation for approval.

The biological-information registration and authentication device 21 includes a biological-information reading section 22, a feature extraction section 23, a biological-information-input-operation extraction section 24, an approval-input-operation determination section 25, a biological information database 26, a biological-information comparison section 27, a biological-information registration section 28, and an action-message presenting section 29.

The biological-information reading section 22 has a sensor for reading a fingerprint, a finger blood vessel pattern, a palm blood vessel pattern, or the like. Examples of the biological-information reading section 22 include capacitance, thermal, electric-field detection, and optical fingerprint sensors.

The feature extraction section 23 extracts the features of the biological information read by the biological-information reading section 22. Examples of the features include branching points at which the ridges of the fingerprint branch and endpoints at which the ridges end.

The biological-information comparison section 27 compares the features of the biological information extracted by the feature extraction section 23 and the features of registered biological information in the biological information database 26 and outputs the result of comparison to the action-message presenting section 29 and the approval-input-operation determination section 25.

The biological-information comparison section 27 may directly compare the biological information without extracting the features of the biological information. The comparison of the biological information may be either one-to-one authentication, which is made by inputting personal identification information, or one-to-N authentication in which no personal identification is made. With a registration and authentication device installed in a personal computer or the like, the number of items of registered biological information is limited, and thus, less authentication time is required even for one-to N authentication.

The biological information database 26 is a database that stores the biological information of a registered user (hereinafter referred to as registered biological information). The biological information database 26 is stored in a storage, such as a memory and a hard disk. The biological information database 26 may be provided either in a nonvolatile storage, such as a hard disk, in the biological-information registration and authentication device 21 or in an external unit so that it can be accessed via a network. The biological information database 26 is an example of a biological-information storage section.

If a failure in the comparison is notified from the biological-information comparison section 27, the action-message presenting section 29 presents an action message requesting a user to perform a predetermined input operation for approval. Examples of the action message include "Perform an input operation for approval" and "Slide your finger toward you" indicating an input operation for approval itself. The action message may be stored either in an approval-input-operation database 30, to be described later, or in another database.

After the action message is displayed, when biological information is input subsequently to unregistered biological information, the biological-information comparison section 27 determines whether the input biological information matches the registered biological information of an administrator having the authority to approve biological information. The registered biological information of the administrator is stored in the biological information database 26 in association with, for example, identification information indicating the administrator.

If the biological-information comparison section 27 determines that the biological information that is input following the unregistered biological information matches the registered biological information of the administrator, the biological-information comparison section 27 notifies the approval-input-operation determination section 25 that the authentication has succeeded.

The biological-information-input-operation extraction section 24 extracts data indicating the input operation of biological information read by the biological-information reading section 22 (hereinafter referred to as input operation data). For example, the direction and speed in/at which biological information is input and the number of inputs made are extracted as input operation data. For fingerprint authentication, for example, the angle of the moving direction and the rotation angle of the finger relative to the biological-information reading section 22 are calculated, and the calculated data is extracted as input operation data.

For fingerprint authentication, the direction and speed of the movement of the finger are obtained by calculating relative displacements of a plurality of images read by the biological-information reading section 22. For the number of inputs, the number of inputs of biological information in a fixed period is counted. The counting is performed by comparing a threshold value determined on the basis of the speed of the input operation and the relative moving distance and intervals between biological-information input operations.

For example, in intermittently detecting images with a biosensor while moving a living organism, the time necessary for a specified number of inputs, Tcount, is obtained from the following expression, $$Tcount = \alpha \cdot D / Vinput$$

where D is a moving distance when biological information is input (the length of a slide at the input), Vinput is a speed calculated from the moving distance of the living organism and the time required for input, and α is a predetermined value (for example, 2 or 3). D is about 2 cm for fingerprint authentication, for example.

The approval-input-operation database 30 stores, for example, data indicating an input operation for approval (hereinafter referred to as approval-input-operation data) and an approval input operation ID that specifies approval-input-operation data in association with each other. The input operation for approval is a specific input operation that is performed when an administrator having approval authority approves registration of biological information. An example of the approval-input-operation data is data indicating the moving direction of a finger or hand. The approval-input-operation database 30 may further store an action message to input an approval input operation. The approval-input-operation database 30 is stored in a storage, such as a memory and a hard disk.

The approval-input-operation determination section 25 determines whether the input operation data of biological information input following unregistered biological information, extracted by the biological-information-input-operation extraction section 24, matches approval-input-operation data stored in the approval-input-operation database 30.

If the approval-input-operation determination section 25 is notified by the biological-information comparison section 27 that the input biological information matches the biological information of the administrator and determines that the input operation data matches the approval input operation data, the approval-input-operation determination section 25 instructs the biological-information registration section 28 to register the unregistered biological information.

The approval-input-operation determination section 25 determines whether the biological-information input operation is an ordinary input operation for authentication, and if it is not the input operation for authentication, the approval-input-operation determination section 25 may determine that it is an input operation for approval.

When the biological-information registration section 28 is given an instruction for registration from the approval-input-operation determination section 25, the biological-information registration section 28 registers the unregistered biological information that is input before in the biological information database 26. For example, the biological-information registration section 28 registers the features of the biological information in the biological information database 26. Thus, the unregistered biological information can be registered in the biological information database 26.

The biological-information registration and authentication process of the biological-information registration and authentication device 21 with the above configuration will be described with reference to the flowchart in FIG. 3. The process in FIG. 3 is executed by, for example, the CPU of the biological-information registration and authentication device 21.

Biological information is read by a biosensor, such as a fingerprint sensor and a vein sensor (S21). The read biological information is temporarily stored, for example, in a memory, as unregistered biological information. The features of the read biological information are extracted (S22).

Input operation data is extracted from the positional and temporal changes of the biological information read by the biosensor (S23). The input biological information and registered biological information in the biological information database 26 are compared (S24). An approval-input-operation determination process is executed (S25).

Figure 3:
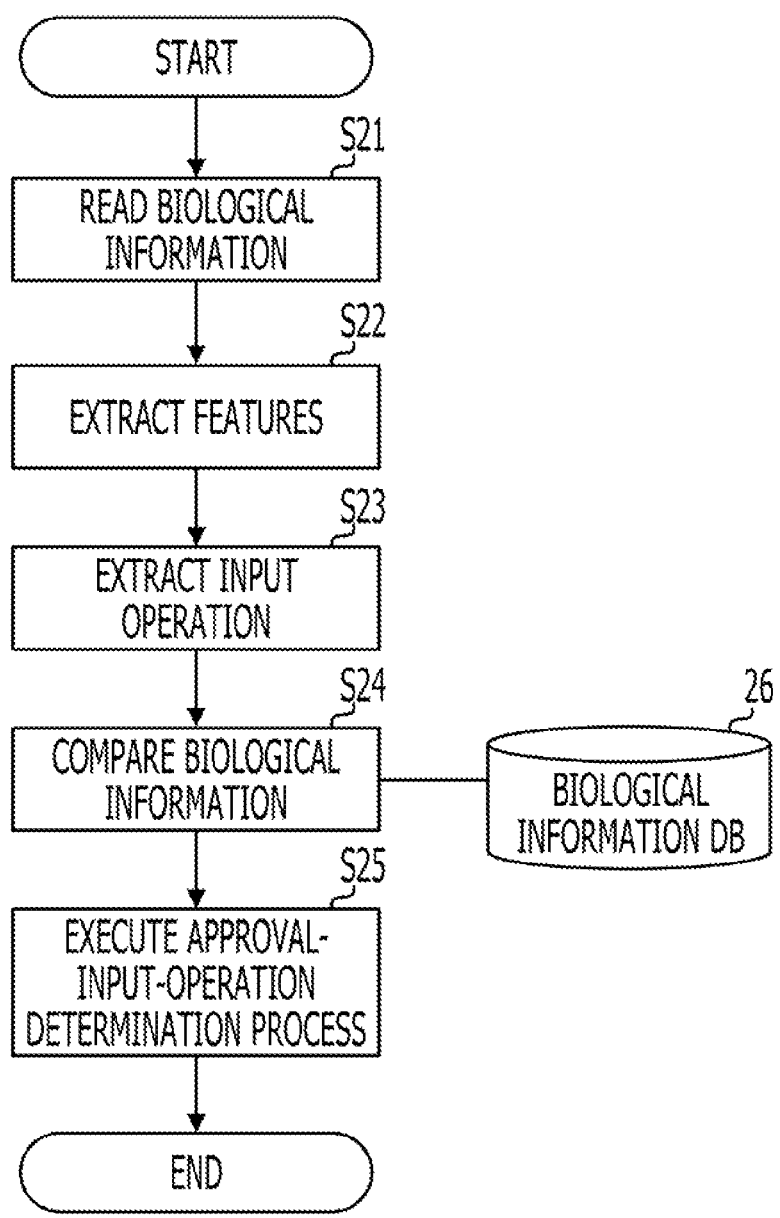
FIG. 3 is a flowchart of a biological-information registration and authentication process of the first embodiment.
Figure 4:
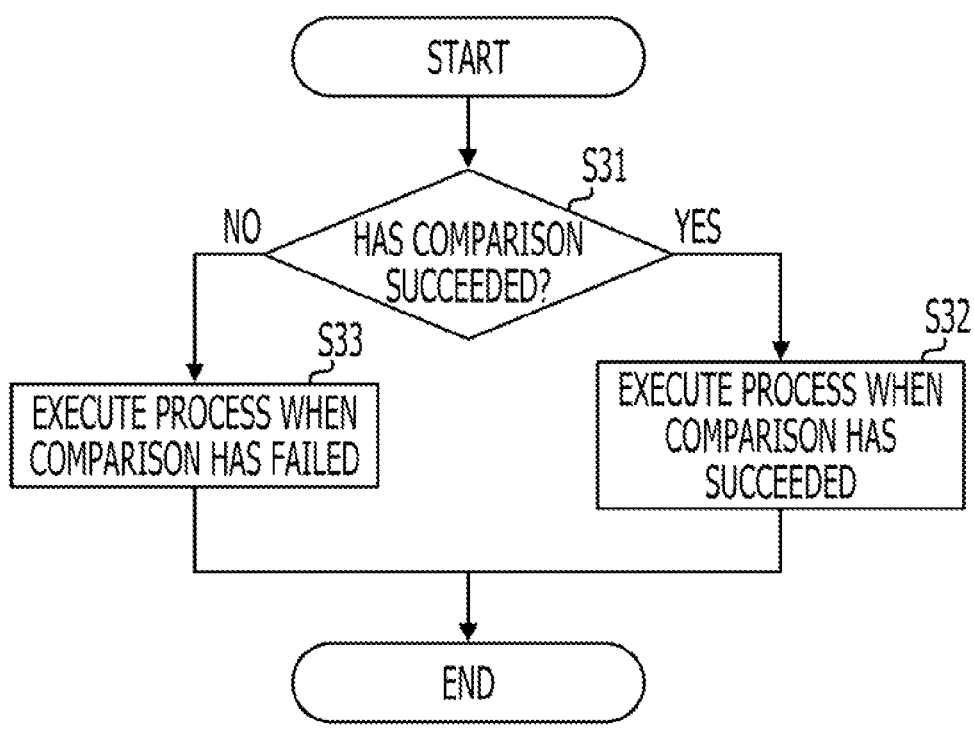
FIG. 4 is a flowchart of an approval-input-operation determination process.

FIG. 4 is a flowchart of the approval-input-operation determination process of operation S25 in FIG. 3. It is determined whether the comparison of the biological information has succeeded (S31). If the comparison has succeeded (S31, YES), the process moves to operation S32, where a process when the comparison has succeeded is executed. If the comparison has failed (S31, NO), that is, if the input biological information is unregistered biological information, the process moves to operation S32, where a process when the comparison has failed is executed.

Figure 5:
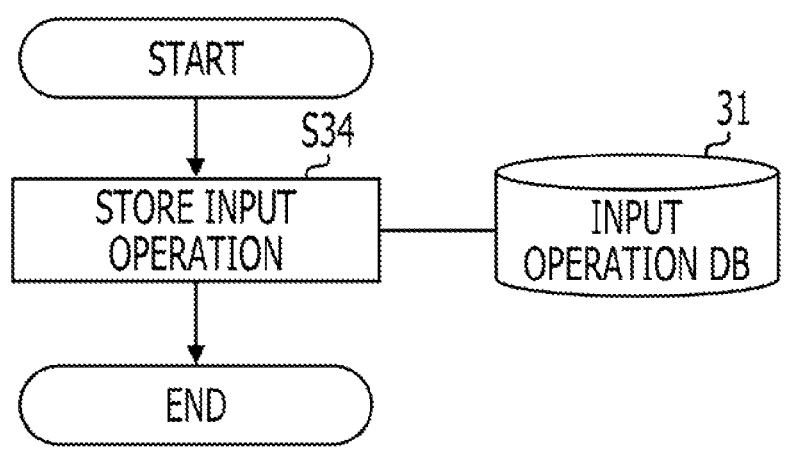
FIG. 5 is a flowchart of a process when comparison has succeeded.

FIG. 5 is a flowchart of the process of operation S32 in FIG. 4 when the comparison has succeeded. If the input biological information is registered in the biological information database 26, the subject of comparison is authenticated, and the input operation data of the biological information at that time is stored in an input operation database 31 (S34).

Figure 6:
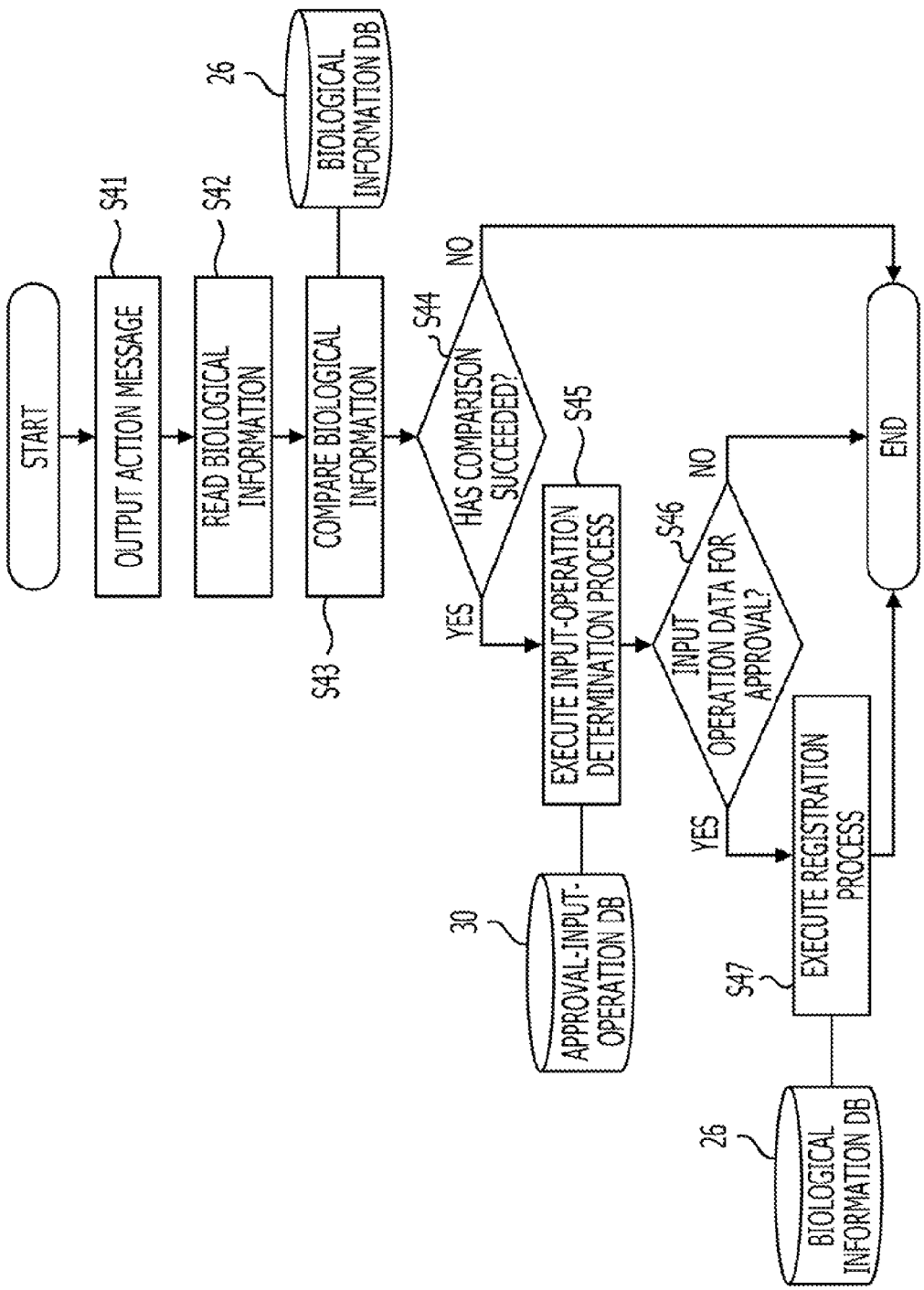
FIG. 6 is a flowchart of a process when comparison has failed.

FIG. 6 is a detailed flowchart of the process of operation S33 in FIG. 4 when the comparison has failed. If the comparison has failed, an action message to input an input operation for authentication is output and is displayed on a display or the like (S41).

Biological information is read by the biosensor or the like, and the input operation of the biological-information is extracted (S42). The read biological information is compared with the registered biological information of the administrator having the authority to approve the biological information (S43). In the process of operation S43, biological information that is input next to the unregistered biological information and the registered biological information of the administrator registered in the biological information database 26 are compared. Discrimination between the administrator and the other registrants can be achieved, for example, by registering the biological information of the administrator in the biological information database 26 in association with identification information for specifying the administrator. Alternatively, a table or the like for specifying the user Id of the administrator is provided.

It is determined whether the comparison of the biological information has succeeded (S44). If the comparison has failed (S44, NO), in other words, if the biological information input for approval does not match the registered biological information of the administrator, the unregistered biological information is not registered, and the process is finished.

On the other hand, if the comparison of the biological information has succeeded (S44, YES), the process moves to the input-operation determination process in operation S45, where the input operation data of the matched biological information and the stored approval input operation data. In the input-operation determination process of operation S45, for example, an input operation ID corresponding to the input operation data of the matched biological information and the input operation ID of the specified approval input operation data registered in the approval-input-operation database 30 are compared.

It is determined whether the input operation data matches the approval input operation data (S46). If the input operation data does not match the approval input operation data (S46, NO), it is determined that ordinary authentication has been performed, and the process is finished without registering the unregistered biological information.

On the other hand, if the input operation data of the biological information matches the approval input operation data (S46, YES), the process moves to operation S47, where an unregistered-biological-information registration process is executed. In the process of operation S47, for example, the biological-information registration section 28 is instructed to register the biological information so that the unregistered biological information stored in the memory or the like is registered in the biological information database 26.

Figure 7:
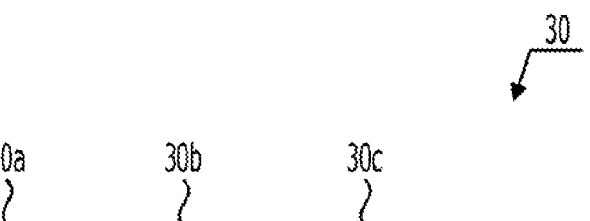
FIG. 7 is a diagram illustrating the configuration of an approval-input-operation database.

FIG. 7 is a diagram illustrating an example of the configuration of the approval-input-operation database 30. FIG. 7 illustrates an example in which approval input operation data, data indicating the number of inputs, and action messages are stored in association with input operation IDs.

The approval-input-operation database 30 includes an input-operation-ID storage area 30a and an approval-input-operation-data storage area 30b that stores a finger moving direction for fingerprint authentication. The approval-input-operation database 30 further includes a repeat-count storage area 30c that stores the repeat count of input operations and an action-message storage area 30d that stores action messages.

The approval-input-operation-data storage area 30b stores data, such as an angle indicating a finger moving direction at authentication, for example, 0° and 180°. Although not shown in FIG. 7, the angle data stored in the approval-input-operation-data storage area 30b includes a certain angle margin, for example, ±10°, for correcting an angle error in the finger moving direction during input.

The approval-input-operation determination section 25 obtains approval input operation data corresponding to a specific input operation ID from the approval-input-operation-data storage area 30b and compares the obtained approval input operation data (for example, angle data) with the input operation data of the biological information to determine whether the input operation data matches the approval input operation data within the certain margin.

The data configuration of the approval-input-operation database 30 is not limited to that shown in FIG. 7. For example, if a single input operation is enough for authentication, the repeat-count storage area 30c is not necessary. The action messages may be stored in another database.

Figure 8:
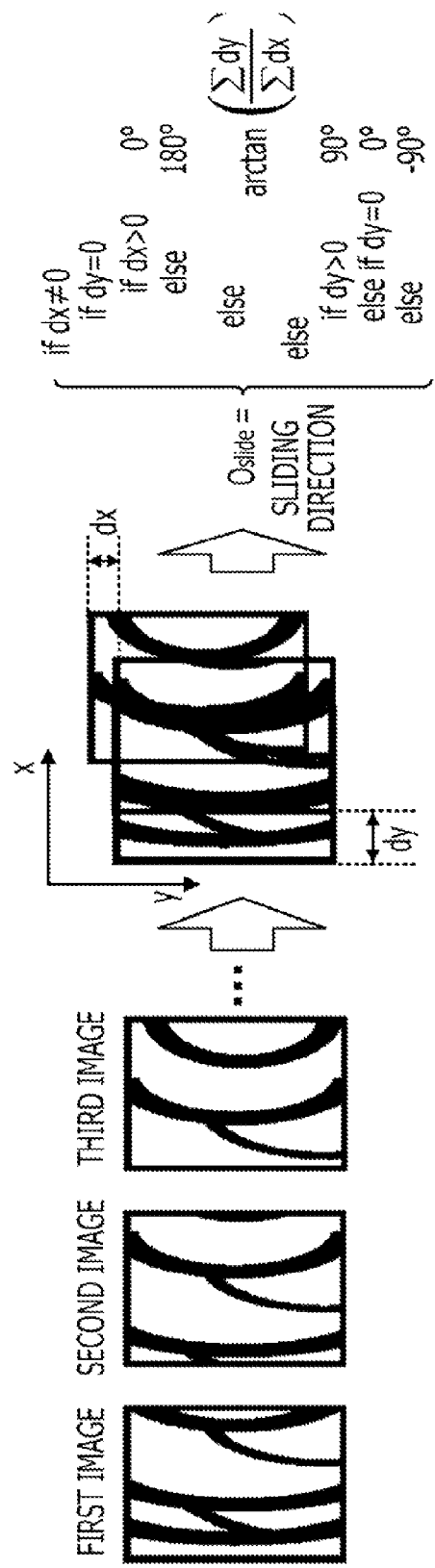
FIG. 8 is an explanatory diagram of a process for calculating an input direction.

FIG. 8 is an explanatory diagram of a process for calculating a fingerprint input direction. When the user reads a fingerprint with the biological-information reading section 22 while moving the finger, a plurality of fingerprint images are read and are stored in the memory or the like.

The correlation of the plurality of partial fingerprint images is calculated, and the partial fingerprint images are overlapped at a position at which the maximum correlation value is obtained. For the two overlapped images, the number of pixels displaced between one pixel and the following pixel is calculated for the x-axis direction and the y-axis direction. The amount of displacement of the pixels in the x-axis direction is dx, and the amount of displacement of the pixels in the y-axis direction is dy. By calculating the accumulated values of dx and dy, the moving direction and moving amount of the fingerprint images can be calculated.

The program shown at the right of FIG. 8 is a program for calculating the angle $\theta$ of the fingerprint moving direction using dy and dx. The angle $\theta$ can be obtained using this program; for example, when dy=0 and dx≠0, $\theta$=0° or 180°, when dx=0 and dy=0, $\theta$=0°, when dy≠0, $\theta$=90° or −90°, and in other cases, the angle $\theta$ can be obtained using arctan($\Sigma$dy/$\Sigma$dx).

Figure 9:
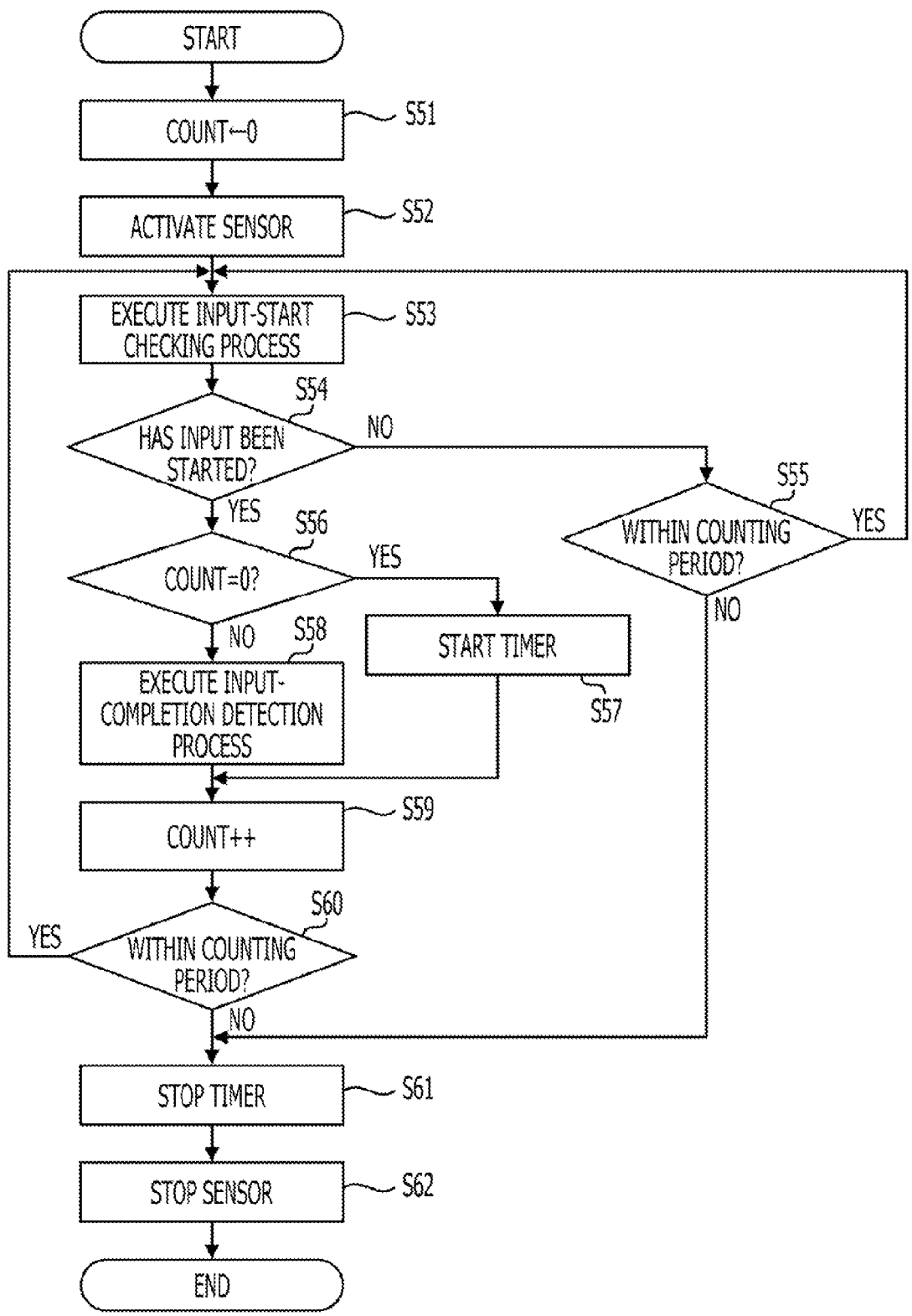
FIG. 9 is a flowchart of a process for counting the number of inputs of biological information.

FIG. 9 is a flowchart of a process for counting the number of inputs of biological information.

An initial value "0" is set for counter Count for counting the number of times a fingerprint is input (S51). A fingerprint sensor is activated (S52), and a fingerprint-input-start checking process is executed (S53).

It is determined whether input of a fingerprint has been started (S54). If input of a fingerprint has not been started (S54, NO), the process moves to operation S55, where it is determined whether it is within a fixed counting period.

If it is within the counting period (S55, YES), the process returns to operation S53, where a fingerprint-input-starting checking process is executed. On the other hand, if it is not within the counting period (S55, NO), it is determined that the reading of the fingerprint in the fixed period has been finished, and the process moves to operation S61, where measurement by the timer is stopped.

If it is determined in operation S54 that input of a fingerprint has been started (S54, YES), the process moves to operation S56, where it is determined whether the counter Count indicates "0".

If the counter Count indicates "0" (S56, YES), that is, if input of a fingerprint is started for the first time, the process moves to operation S57, where measurement by the timer is started. The timer is for measuring whether the fixed counting period has been reached.

If the counter Count does not indicate "0" (S56, NO), that is, input of a fingerprint has already been started, the process moves to operation S58, where a fingerprint-input-completion detection process is executed. An example of the fingerprint-input-completion detection process of operation S58 is a process for detecting end times of individual fingerprint reading operations when fingerprint reading is repeated a plurality of times.

The counter Count is incremented (S59). It is determined whether the timer measurement time is within the counting period (S60). If the timer measurement time is within the fixed counting period (S60, YES), the process returns to operation S53, where an input-starting checking process is executed.

On the other hand, when the timer measurement time has reached the counting period (S60, NO), the process moves to operation S61, where the measurement by the timer is stopped. Furthermore, the operation of the fingerprint sensor is stopped (S62).

Figure 10:
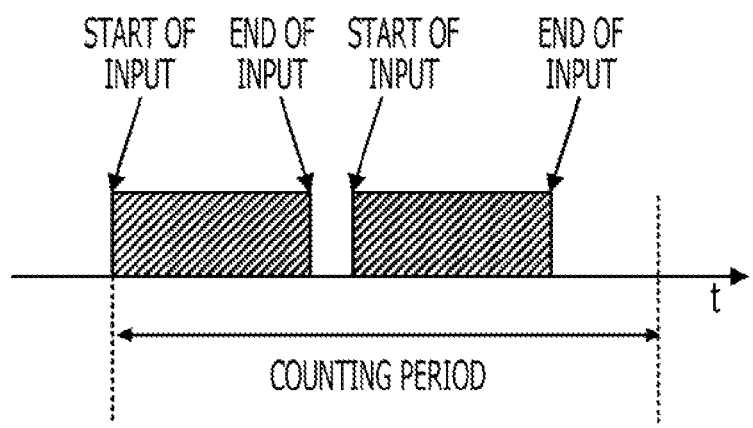
FIG. 10 is a diagram illustrating the input start and end timings of a fingerprint sensor.

FIG. 10 is a diagram illustrating the start and end times of fingerprint input in the process of counting the number of fingerprint inputs, described above. To count the number of fingerprint inputs as an approval input operation, a determination is made whether a predetermined number of fingerprint inputs have been performed within a predetermined counting period.

If fingerprint inputs are detected by a fingerprint sensor, as shown in FIG. 10, measurement of the counting period is started. Every time the end of fingerprint input is detected, the counter Count that indicates the number fingerprint inputs is incremented. At the point where a fixed counting period has elapsed, it is determined whether the value of the counter Count matches a predetermined number of detections. If the value matches the number of detections of a fingerprint, it is determined that an operation for approving registration of biological information has been performed.

The first embodiment described above offers the following advantages. The biological information of an unregistered person can easily be registered when a person having an authority to approve biological information (for example, an administrator) performs a predetermined biological-information input operation.

The conventional registration method has drawbacks because an administrator performs a specific operation for registration to switch the mode from an authentication mode to a registration mode, and biological information is registered in the registration mode. Specifically, if the administrator leaves the biological-information registration and authentication device 21 after switching the mode to the registration mode, there is the possibility that biological information is improperly registered by a third person.

In contrast, with the biological-information registration and authentication method of the first embodiment, when the administrator performs an input operation for approval, unregistered biological information that is input before is registered, but biological information that is input thereafter is not registered. Accordingly, this can reduce security risks in registration as compared with the conventional registration and authentication method that requires switching from the authentication mode to the registration mode.

Even if unregistered biological information is input, biological information that is input before is not registered simply when an administrator having approval authority authorizes it, which can prevent the administrator from unintentionally approving the unregistered biological information.

Furthermore, in the case where a predetermined approval input operation itself is displayed as an action message, an approving operation can be performed even if the user does not remember the approval input operation or without reading a manual etc. This can simplify the biological-information registering operation. This is advantageous particularly for computers used in home and small offices because they require the ease of the registering operation rather than high security. To enhance the security of the registering operation, a message that does not indicate an approval input operation itself but a message to perform an input operation may be displayed.

Figure 11:
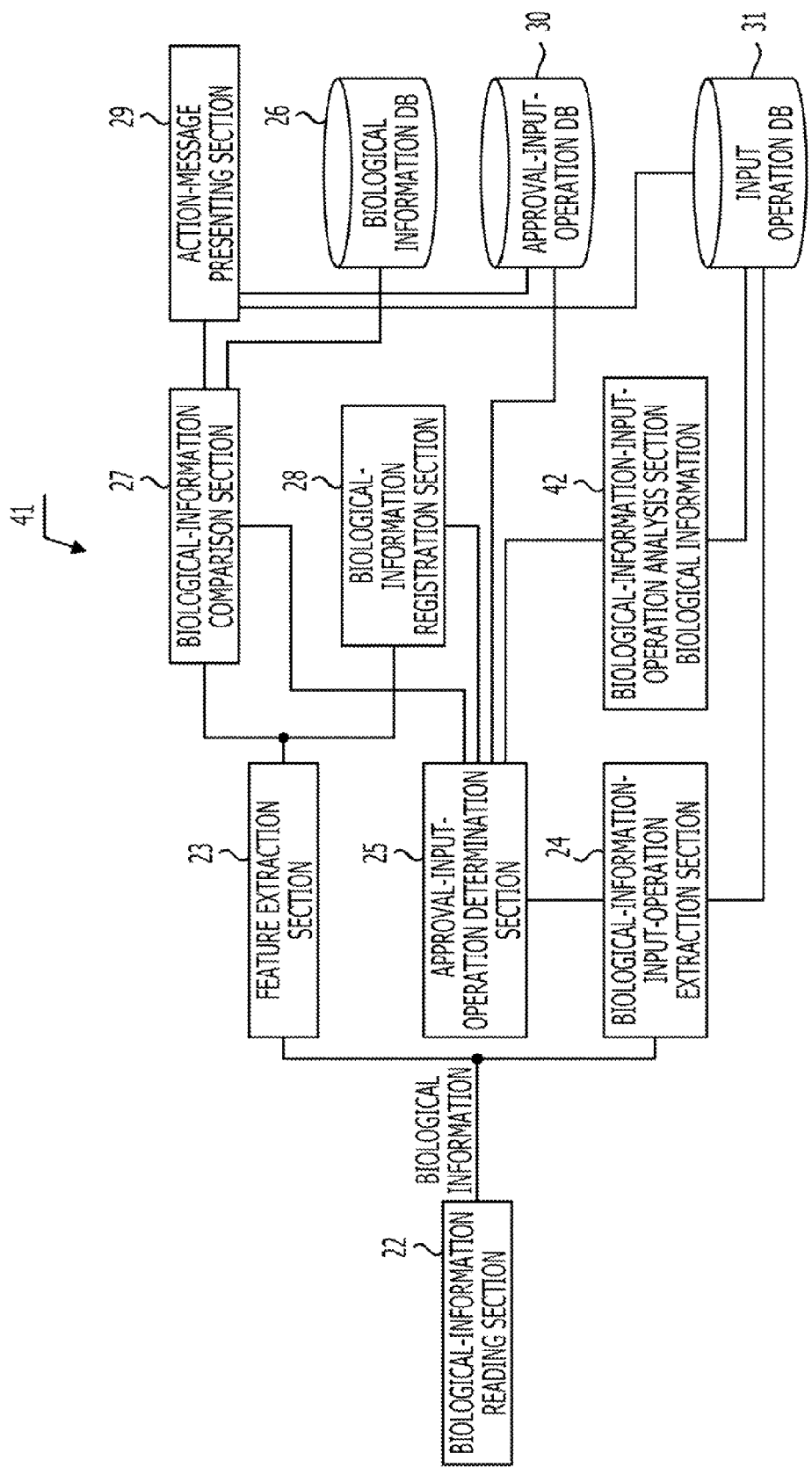
FIG. 11 is a diagram illustrating the configuration of a biological-information registration and authentication device of a second embodiment.

Next, FIG. 11 is a diagram illustrating the configuration of a biological-information registration and authentication device 41 of a second embodiment. In FIG. 11, the same blocks as those in FIG. 2 are given the same reference signs, and descriptions thereof will be omitted.

The biological-information registration and authentication device 41 includes a biological-information reading section 22, a feature extraction section 23, a biological-information-input-operation extraction section 24, an approval-input-operation determination section 25, a biological information database 26, a biological-information comparison section 27, and a biological-information registration section 28. The biological-information registration and authentication device 41 further includes an action-message presenting section 29, a biological-information-input-operation analysis section 42, an approval-input-operation database 30, and an input operation database 31.

The input operation database 31 stores input operation data of biological information for authentication and approval extracted by the biological-information-input-operation extraction section 24. The input operation database 31 is stored in storage, such as a memory and a hard disk.

The biological-information-input-operation analysis section 42 analyzes a plurality of items of input operation data stored in the input operation database 31 and identifies the highest-frequency input operation data. The identified highest-frequency input operation data is output to the approval-input-operation determination section 25 as data for determining an approval input operation.

When the approval-input-operation determination section 25 is notified by the biological-information comparison section 27 that the biological information matches the registered biological information of a person having approval authority, the authorized-input-operation determination section 25 determines whether the input operation data of the biological information matches the highest-frequency input operation data. In this determination, for example, an input operation ID corresponding to the extracted input operation data is identified, and it is determined whether the input operation ID matches the input operation ID of the highest-frequency input operation data.

If the input operation data of the biological information matches the highest-frequency input operation data, the authorized-input-operation determination section 25 determines that an input operation for authentication has been performed and terminates the process without registering the unregistered biological information.

On the other hand, if the input operation data of the biological information does not match the highest-frequency input operation data, the authorized-input-operation determination section 25 determines that an input operation for approval has been performed and instructs the biological-information registration section 28 to register the unregistered biological information.

According to the second embodiment, unregistered biological information can easily be registered when a person having approval authority performs an input operation other than an input operation for authentication which may occur at the highest frequency.

Figure 12:
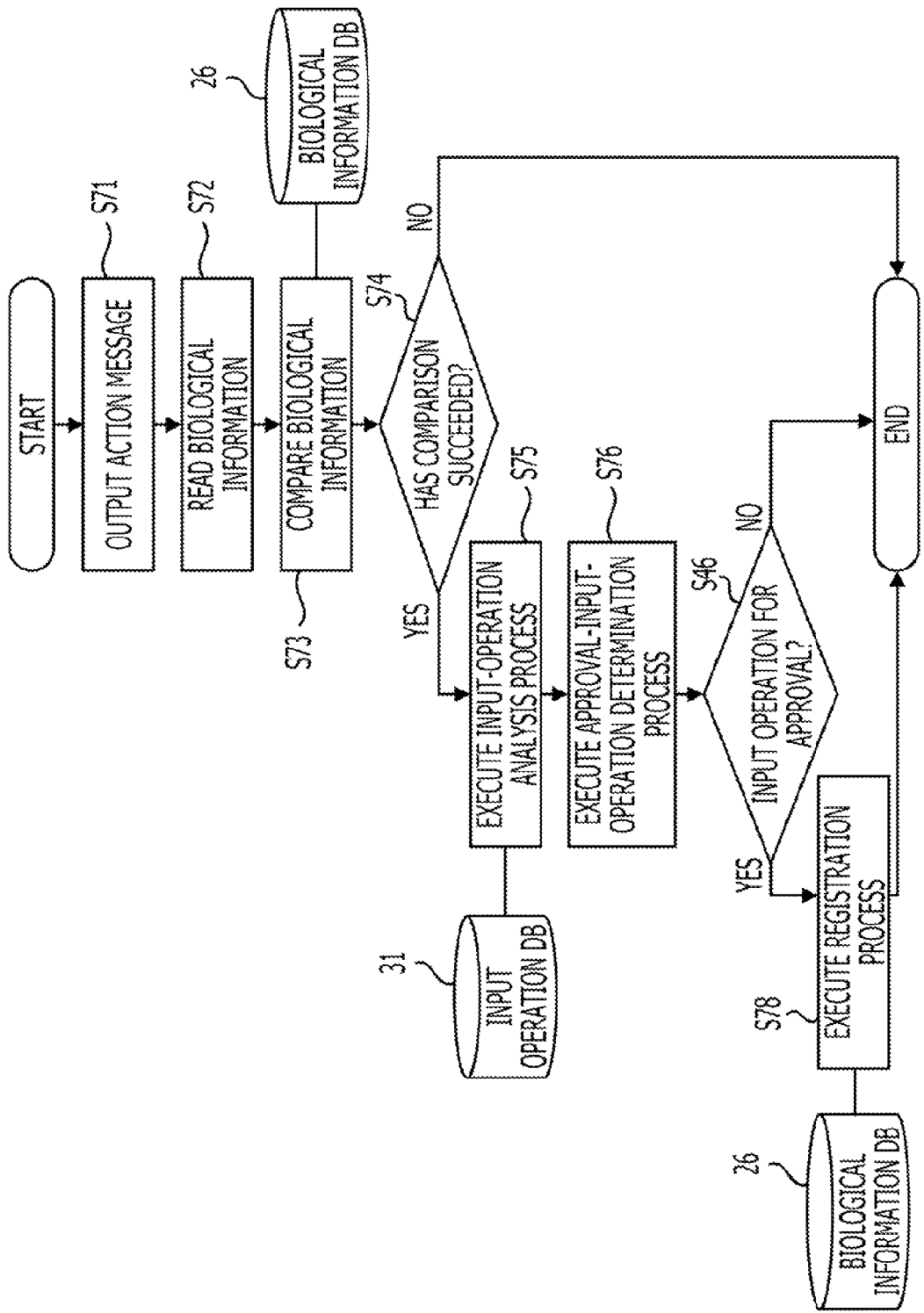
FIG. 12 is a flowchart illustrating a process when comparison has failed of the second embodiment.

The operation of the biological-information registration and authentication device 41 in FIG. 11 will be described with reference to a flowchart in FIG. 12. The process in FIG. 12 is executed by the CPU or the like of the biological-information registration and authentication device 41.

In the biological-information registration and authentication process of the second embodiment, the processes from the reading of biological information to the determination whether the comparison has succeeded or failed are substantially the same as those of FIGS. 3 and 4. A process in the case where the comparison of biological information has failed will be described with reference to FIG. 12.

If the comparison of biological information has failed, an action message to input an approval input operation is output (S71). In the process of operation S71, a message indicating an input operation, for example, "Slide your finger toward you", may be displayed as an action message.

If biological information is input in response to the display of the action message, the biological information is read (S72). The read biological information and the registered biological information of an administrator having approval authority are compared (S73). The registered biological information of the administrator can be obtained as one or a plurality of items of registered biological information, in which the attributes of the administrator are set, in the registered biological information stored in the biological information database 26.

A determination is made whether the comparison of the biological information has succeeded or failed (S74). If the comparison has failed (S74, NO), in other words, the input biological information is not the biological information of the administrator having approval authority, registration of the unregistered biological information is not performed, the process ends.

On the other hand, if the comparison has succeeded (S74, YES), the process moves to operation S75, where an input-operation analysis process is executed. In the input-operation analysis process of operation S75, for example, the highest-frequency input operation data of the plurality of items of input operation data stored in the input operation database 31 is identified.

An approval-input-operation determination process is executed (S76). In the approval-input-operation determination process of operation S76, the input operation data of the biological information and the highest-frequency input operation data identified in the input-operation analysis process are compared.

A determination is made whether the input operation data of the biological information matches the highest-frequency input operation data (S77). If it is determined that the input operation data matches the highest-frequency input operation data, it is determined that it is not an input operation for approval (S77, NO), and the unregistered biological information is not registered, the process ends.

On the other hand, if it is determined that the input operation data of the biological information does not match the highest-frequency input operation data, it is determined that an input operation for approval has been performed (S77, YES), and the process moves to operation S78, where a registration process is executed. In this registration process, unregistered biological information, which is input before and stored in the memory or the like, is registered in the biological information database 26.

The processes in operations S75 to S76 described above may be as follows. In the input-operation analysis process of operation 75, the highest-frequency input operation data or a plurality of items of higher-frequency input operation data of the data stored in the input operation database 31 is identified, and input operation data other than the data is selected as approval input operation data. The selected input operation data is output to the approval-input-operation determination section 25 as approval input operation data. In the approval-input-operation determination process of operation S76, the input operation data of the biological information is compared with input operation data other than the selected highest-frequency input operation data (or higher-frequency input data). If they match, it is determined that an input operation for approval has been performed.

The second embodiment described above offers the following advantages.

Biological information can be registered when a person having the authority to approve the biological information performs an input operation other than the highest-frequency biological information input operation. This allows the user to easily perform a biological information approval operation even if the user does not remember an input operation for approving biological information.

Since this is not the registration method in which an administrator having approval authority performs a special operation to switch the mode from an authentication mode to a registration mode, there is little possibility that biological information is improperly registered by a third person when the administrator leaves the biological-information registration and authentication device 21 after switching the mode to the registration mode. This is because once the administrator approves unregistered biological information, another unregistered biological information cannot be registered even if it is input. Accordingly, this can reduce the security risk in registration as compared with the conventional registration and authentication method that requires switching from an authentication mode to a registration mode.

Furthermore, for example, by displaying a predetermined approval input operation itself as an action message, an approving operation can be performed even if the user does not remember the approval input operation or without reading a manual etc. This can simplify the biological-information registering operation. This is advantageous particularly for computers used in home and small offices because they require the ease of the registering operation rather than high security. To enhance the security of the registering operation, a message that does not indicate an approval input operation itself but a message to perform an approval input operation may be displayed.

Figure 13:
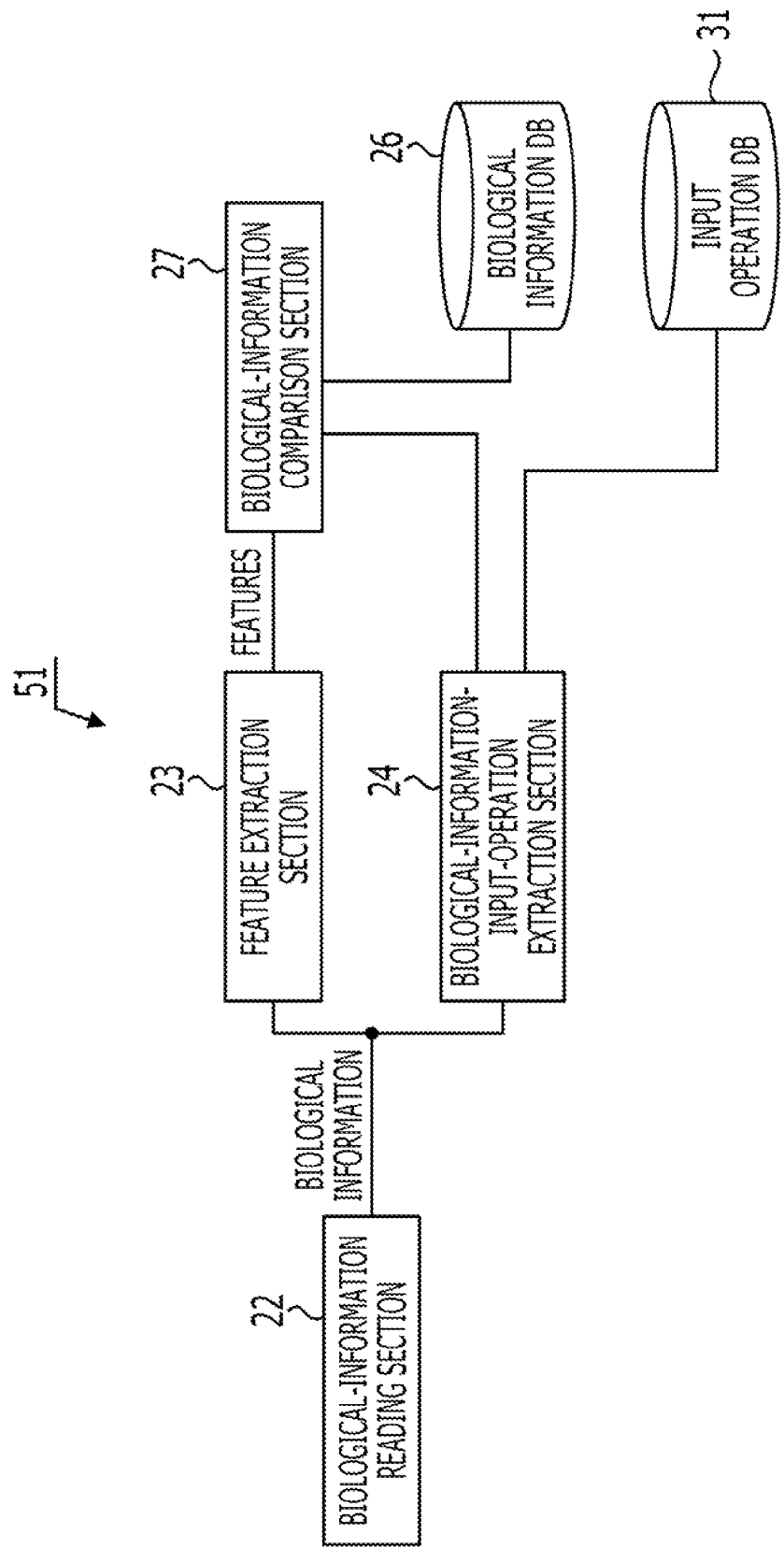
FIG. 13 is a diagram illustrating the configuration of a biological-information registration and authentication device according to a third embodiment.

FIG. 13 is a diagram illustrating the configuration of a biological-information registration and authentication device 51 according to a third embodiment. In the third embodiment, when comparison has succeeded, input operation data of biological information is stored in a storage in association with identification information that identifies the user. If a comparison has failed, input operation data is stored in the storage in association with information indicating that it is unregistered.

FIG. 13 shows part of the functions of the biological-information registration and authentication device 51. In FIG. 13, the same blocks as those in FIG. 2 are given the same reference signs, and descriptions thereof will be omitted.

The biological-information registration and authentication device 51 includes a biological-information reading section 22, a feature extraction section 23, a biological-information-input-operation extraction section 24, and a biological-information comparison section 27. The biological-information registration and authentication device 51 further includes a biological information database 26 that stores biological information of a registrant and an input operation database 31 that stores input operation data for authentication or the like.

The biological-information comparison section 27 compares features extracted from input biological information and the features of registered biological information stored in the biological information database 26. If the features match, the successful result of the comparison and a corresponding user ID registered in the biological information database 26 are output to the biological-information-input-operation extraction section 24.

The biological-information-input-operation extraction section 24 extracts the input operation data of the biological information and, if the authentication has succeeded, stores an input operation ID that identifies the extracted input operation data in the input operation database 31 in association with the user ID of the authenticated user. If the authentication has failed, the biological-information-input-operation extraction section 24 stores the input operation ID that identifies the extracted input operation data in the input operation database 31 in association with information indicating that it is unregistered.

By storing an input operation ID that identifies the input operation data of biological information in the input operation database 31 in association with a user ID or information indicating that it is unregistered and by summing up the number of data items having the same input operation ID, highest-frequency input operation data or higher input frequency input operation data can be identified.

Figure 14:
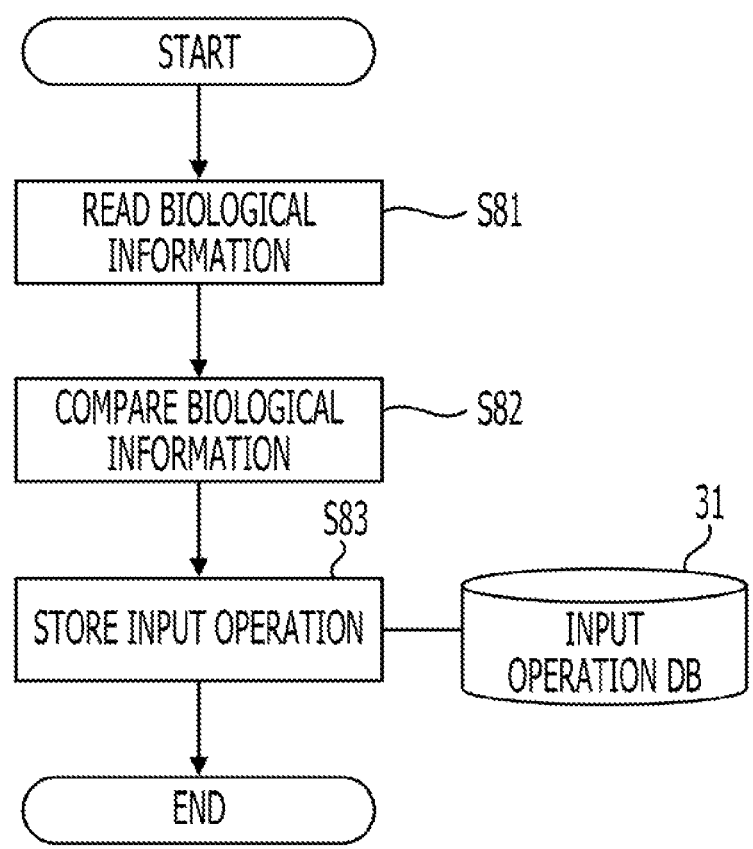
FIG. 14 is a flowchart of a process for storing biological-information input operation data of the third embodiment.

FIG. 14 is a flowchart of a process for storing input operation data according to the third embodiment. The process of FIG. 14 is executed by the microprocessor or the like of the biological-information registration and authentication device 51.

Biological information is read by a biosensor or the like, and a biological-information input operation is extracted (S81). The read biological information and biological information registered in the biological information database 26 are compared (S82).

The input operation data of the biological information is extracted, and the input operation ID of the extracted input operation data is identified with reference to predefined input operation definition data, and the identified input operation ID is stored in the input operation database 31 in association with a user ID (S83). The identification of the input operation ID in operation S83 is performed with reference to, for example, an input operation table 32 (FIG. 15A) in which input operation definition data that defines input operations and input operation IDs are associated with each other.

Figure 15A:
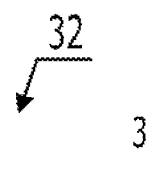
FIG. 15A is a diagram illustrating the data configuration of an input operation table.

FIG. 15A is a diagram illustrating an example of the data configuration of the input operation table 32. The input operation table 32 defines finger input operations for fingerprint authentication. The input operation table 32 has an input-operation-ID storage area 32a that stores input operation IDs that identify input operation data and an input-operation-definition-data storage area 32b that stores data that defines finger moving directions. The input-operation-definition-data storage area 32b stores, for example, for fingerprint authentication, angle data indicating a direction in which the finger is moved and a margin of error $\alpha$.

If the finger moving direction extracted by the biological-information-input-operation extraction section 24 is $0°\pm\alpha°$, "M_0001" is set as an input operation ID with reference to the input operation table 32. If the finger moving direction is $180°\pm\alpha°$, "M_0002" is set as an input operation ID with reference to the input operation table 32.

Accordingly, input operation IDs corresponding to input operation data can be obtained with reference to the foregoing input operation table 32.

Figure 15B:
FIG. 15B is a diagram illustrating the data configuration of a database in which user IDs and input operation IDs are associated with each other.

FIG. 15B is a diagram illustrating the data configuration of a database 33 in which user IDs and input operation IDs are associated with each other. The database 33 is stored, for example, as part of the input operation database 31.

The database 33 has a user-ID storage area 33a that stores user IDs and an input-operation-ID storage area 33b that stores input operation IDs. If comparison has succeeded, the user-ID storage area 33a stores a user ID transmitted from the biological-information comparison section 27, and if comparison has failed, the user-ID storage area 33a stores data indicating that the biological information is unregistered (for example, NONE).

The input-operation-ID storage area 33b stores input operation IDs determined with reference to the input operation definition data in the input operation table 32 described above. Accordingly, by summing up the number of data items of the same input operation ID registered in the database 33, highest-frequency input operation data and higher-frequent input operation data can be identified.

According to the third embodiment described above, the user ID of a user whose identification has succeeded in comparison and an input operation ID can be stored in the database 33 in association with each other. Furthermore, if authentication has failed, data indicating that the biological information is unregistered and an input operation ID can be stored in the database 33 in association with each other. Thus, by summing up the number of data items of input operation IDs stored in the database 33, the highest-frequency input operation ID (or input operation data) can be identified.

Figure 16:
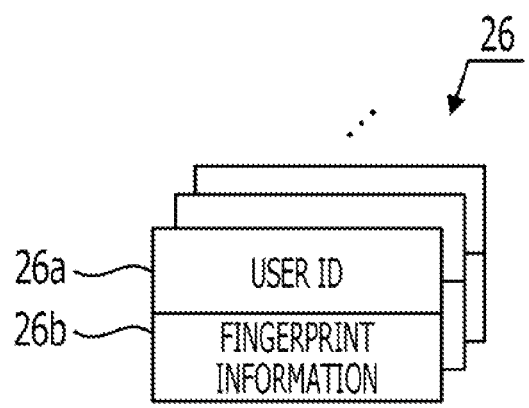
FIG. 16 is a diagram illustrating the data structure of a biological information database.

Here, the data structures of the biological information database 26, the approval-input-operation database 30, and the input operation database 31 will be described. FIG. 16 is a diagram illustrating an example of the data structure of the biological information database 26. The biological information database 26 has a plurality of pairs of a user-ID storage area 26a that stores user IDs and a biological-information storage area 26b that stores biological information, for example, fingerprint information.

By comparing fingerprint information registered in the foregoing biological information database 26 and input fingerprint information, it can be determined whether the person to be authenticated is a registrant. If the comparison has succeeded, a corresponding user ID can be obtained from the biological information database 26.

Figure 17:
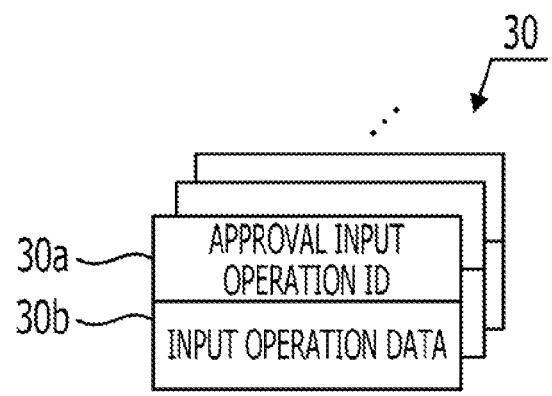
FIG. 17 is a diagram illustrating the data structure of an approval-input-operation database.

FIG. 17 is a diagram illustrating an example of the data structure of the approval-input-operation database 30. The approval-input-operation database 30 has one or a plurality of pairs of an approval-input-operation-ID storage area 30a that stores approval input operation IDs and an approval-input-operation-data storage area 30b that stores approval input operation data. The approval input operation IDs are the same IDs as the input operation IDs.

The approval-input-operation database 30 may store only approval input operation IDs, and another table or database in which approval input operation IDs and input operation data are associated may be provided. The approval-input-operation database 30 may have another storage area that stores action messages.

By comparing the approval input operation data in the approval-input-operation database 30, described above, and input operation data extracted by the biological-information-input-operation extraction section 24, it can be determined whether the biological-information input operation is an input operation for approval.

Figure 18:
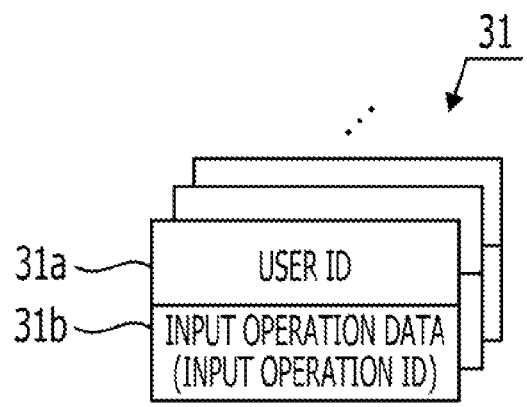
FIG. 18 is a diagram illustrating the data structure of an input operation database.

FIG. 18 is a diagram illustrating an example of the data structure of the input operation database 31. The input operation database 31 has a plurality of pairs of a user-ID storage area 31a that stores user IDs and an input-operation-data storage area 31b that stores input operation data. The input-operation-data storage area 31b may store either input operation IDs that identify input operation data or both of input operation data and input operation IDs.

By summing up the number of data items of the same input operation data or input operation IDs stored in the foregoing input operation database 31, the highest-frequency input operation or higher-frequency input operation of the user can be identified. Thus, an input operation for approval can be determined with reference to the result of summation.

Figure 19:
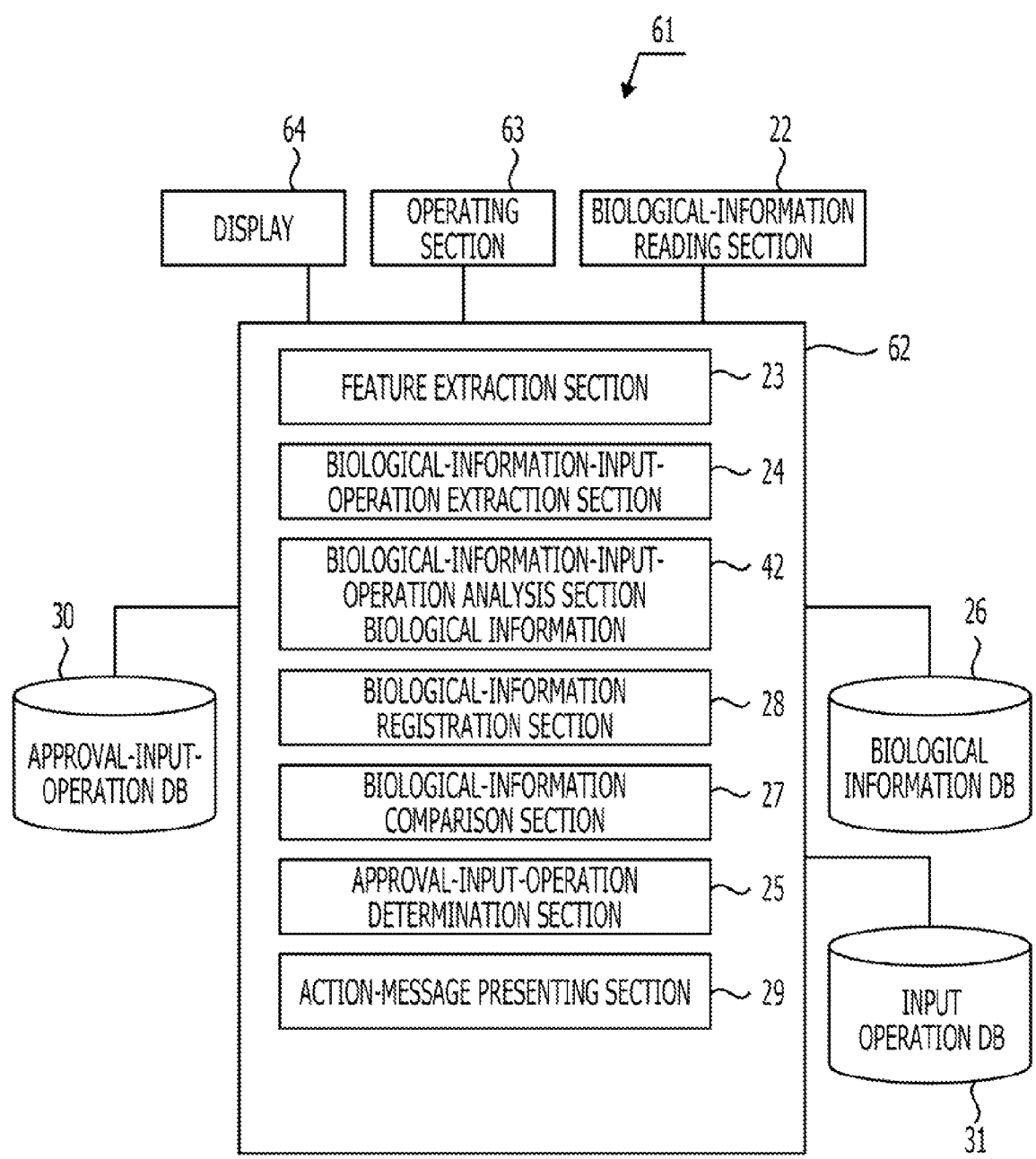
FIG. 19 is a diagram illustrating the configuration of another biological-information registration and authentication device.

FIG. 19 is a diagram illustrating the configuration of another biological-information registration and authentication device 61. The same blocks as those in FIG. 2 are given the same reference signs, and descriptions thereof will be omitted. The biological-information registration and authentication device 61 includes a control unit 62, an operating section 63, a display 64, a biological information database 26, an approval-input-operation database 30, and an input operation database 31.

The control unit 62 includes a feature extraction section 23, a biological-information-input-operation extraction section 24, a biological-information-input-operation analysis section 42, a biological-information registration section 28, a biological-information comparison section 27, an approval-input-operation determination section 25, and an action-message presenting section 29. The control unit 62 can be implemented by, for example, a microprocessor.

If it is determined that input biological information is unregistered biological information, the action-message presenting section 29 outputs an action message to perform an input operation for approving the unregistered biological information to the display 64 and displays the action message.

When the next biological information is input, the biological-information-input-operation extraction section 24 extracts a biological-information input operation. The biological-information-input-operation analysis section 42 analyzes what input operation has been performed and stores the result of analysis in the input operation database 31.

The biological-information comparison section 27 compares the input biological information and registered biological information registered in the biological information database 26 to determine whether they match. The approval-input-operation determination section 25 determines whether the input operation data of the biological information matches an input operation for approval registered in the approval-input-operation database 30.

If the comparison of the biological information has succeeded, and it is determined that the biological-information input operation matches the input operation for approval, the biological-information registration section 28 is instructed to register the unregistered biological information. Thus, the biological information can be registered in the biological information database 26.

The biological-information registration and authentication device 61 allows a person having authority to approve biological information to register unregistered biological information by performing a predetermined input operation for approval. This allows biological information to be registered easily with security.

Although the foregoing embodiments have been described as applied to fingerprint authentication, the present invention is not limited thereto and can be applied to a biological-information registration and authentication device that performs authentication using a blood vessel pattern, for example, the veins and arteries of a palm or a finger, or another biological information.

All examples and conditional language recited herein are intended for pedagogical purposes to aid the reader in understanding the invention and the concepts contributed by the inventor to furthering the art, and are to be construed as being without limitation to such specifically recited examples and conditions. Although the embodiments of the present invention have been described in detail, it should be understood that the various changes, substitutions, and alterations could be made hereto without departing from the spirit and scope of the invention.

What is claimed is:

1. A biological-information authentication device comprising:
a memory; and
a processor coupled to the memory, and configured to:
read first biological information after second biological information is read,
compare the first biological information with registered biological information,
extract input operation data indicating an input operation of the first biological information, and
register the second biological information, when the input operation data matches approval input operation data indicating a certain input operation for approval, the first biological information matches an administrator's biological information among the registered biological information, and the second biological information does not match the registered biological information.

2. The device according to claim 1, the processor being further configured to:
store user identification information that identifies a user and the input operation data or an input operation ID that identifies the input operation data;
wherein user identification information that identifies a user associated with the user identification information is obtained and stores the obtained user identification information and the extracted input operation data or the input operation ID that identifies the input operation data in association with each other.

3. The device according to claim 1, the processor being further configured to:
store user identification information that identifies a user and the input operation data or an input operation ID that identifies the input operation data;
wherein user identification information that identifies a user associated with the user identification information or information indicating that the biological information is unregistered is obtained and stores the user identification information or the information indicating that the biological information is unregistered and the extracted input operation data or an input operation ID that identifies the input operation data in association with each other.

4. The device according to claim 1, the processor being further configured to:
store one or a plurality of items of approval input operation data indicating an input operation for approval;
wherein whether the input operation data of the biological information extracted matches the approval input operation data is determined.

5. The device according to claim 1, the processor being further configured to:
store user identification information that identifies a user and the input operation data or an input operation ID that identifies the input operation; and
identify highest-frequency input operation data of the plurality of items of input operation data;
wherein whether the input operation data extracted matches the highest-frequency input operation data identified is determined, and when it is determined that the input operation data does not match the highest-frequency input operation data, instructs to register the unregistered biological information.

6. The device according to claim 1, the processor being further configured to:
present an action message to perform an input operation for approval when the biological information is unregistered biological information is determined.

7. The device according to claim 6, wherein
when biological information input in response to the action message matches the registered biological information of an administrator having approval authority is determined, whether the input operation data of the biological information matches approval input operation data corresponding to the action message is determined.

8. The device according to claim 6, wherein
an action message indicating an input operation for approval is presented.

9. The biological-information authentication device according to claim 1,
wherein the processor is further configured to:
read the second biological information before the first biological information is read,
compare the second biological information with registered biological information stored in a biological information database, and
store the second biological information in the memory, when it is determined the second biological information does not match the registered biological information, and
wherein the second biological information is stored in the biological information database when the input operation data matches the approval input operation data, the first biological information matches the administrator's biological information, and the second biological information does not match the registered biological information.

10. A biological information authentication method comprising:
reading, by a processor, first biological information after second biological information is read;
comparing the first biological information with registered biological information;
extracting input operation data indicating an input operation of the first biological information; and
registering the second biological information, when the input operation data matches approval input operation data indicating a certain input operation for approval, and the first biological information matches an administrator's biological information among the registered biological information, and the second biological information does not match the registered biological information.

11. The method according to claim 10, further comprising:
obtaining user identification information that identifies a user associated with the user identification information; and
storing the obtained user identification information and the extracted input operation data or an input operation ID that identifies the input operation data in association with each other.

12. The method according to claim 10, further comprising:
obtaining user identification information that identifies a user associated with the user identification information or information indicating that the biological information is unregistered; and
storing the user identification information or the information indicating that the biological information is unregistered and the extracted input operation data or an input operation ID that identifies the input operation data in association with each other.

13. The method according to claim 10, further comprising:
identifying highest-frequency input operation data of the plurality of items of input operation data;
determining whether the extracted input operation data matches the highest-frequency input operation data; and
registering the unregistered biological information when it is determined that the input operation data does not match the highest-frequency input operation data.

14. The method according to claim 10, further comprising:
presenting an action message to perform an input operation for approval when it is determined that the input biological information is unregistered biological information.

15. The method according to claim 14, further comprising:
determining whether biological information input in response to the presented action message matches the registered biological information of the administrator having approval authority and whether the input operation data of the biological information matches approval input operation data corresponding to the action message.

* * * * *